(12) United States Patent
Akin et al.

(10) Patent No.: US 9,201,835 B2
(45) Date of Patent: Dec. 1, 2015

(54) ACCESS LINE BONDING AND SPLITTING METHODS AND APPARATUS

(75) Inventors: Huseyin Cahit Akin, San Diego, CA (US); Mustafa Arisoylu, San Diego, CA (US); Rene L. Cruz, San Diego, CA (US); Rajesh Mishra, San Diego, CA (US)

(73) Assignee: Mushroom Networks, Inc, San Diego, CA (US)

( * ) Notice: Subject to any disclaimer, the term of this patent is extended or adjusted under 35 U.S.C. 154(b) by 1922 days.

(21) Appl. No.: 12/069,886

(22) Filed: Feb. 12, 2008

(65) Prior Publication Data

US 2008/0219281 A1    Sep. 11, 2008

Related U.S. Application Data

(60) Provisional application No. 60/901,078, filed on Feb. 12, 2007.

(51) Int. Cl.
*H04L 12/28* (2006.01)
*G06F 15/16* (2006.01)

(52) U.S. Cl.
CPC .................................. *G06F 15/16* (2013.01)

(58) Field of Classification Search
None
See application file for complete search history.

(56) References Cited

U.S. PATENT DOCUMENTS

| | | | |
|---|---|---|---|
| 5,530,700 A | 6/1996 | Tran et al. | |
| 6,052,733 A * | 4/2000 | Mahalingam et al. | 709/235 |
| 6,141,355 A | 10/2000 | Palmer | |
| 6,215,797 B1 | 4/2001 | Fellman | |
| 6,246,702 B1 | 6/2001 | Fellman | |
| 6,253,247 B1 | 6/2001 | Bhaskar | |
| 6,295,276 B1 | 9/2001 | Datta | |
| 6,463,056 B1 | 10/2002 | Silva | |
| 6,490,295 B1 | 12/2002 | Cooklev et al. | |
| 6,493,341 B1 | 12/2002 | Datta | |
| 6,594,261 B1 | 7/2003 | Boura | |
| 6,594,685 B1 | 7/2003 | Mishra | |
| 6,661,804 B2 | 12/2003 | Fellman | |
| 6,751,231 B2 | 6/2004 | Fellman | |
| 6,775,235 B2 | 8/2004 | Datta | |
| 6,865,185 B2 | 3/2005 | Patel et al. | |
| 6,910,149 B2 | 6/2005 | Perloff et al. | |
| 6,954,272 B2 | 10/2005 | Lam | |
| 7,002,993 B1 | 2/2006 | Mohaban et al. | |
| 7,164,370 B1 | 1/2007 | Mishra | |

(Continued)

FOREIGN PATENT DOCUMENTS

WO    WO/2008/100536    8/2008

*Primary Examiner* — Nicholas Sloms
(74) *Attorney, Agent, or Firm* — Gazdzinski & Associates PC

(57) ABSTRACT

Methods and apparatus for aggregating communication channels. In one exemplary embodiment an aggregation device is required only on one side of the set of communication channels being aggregated. Advantageously, no modifications to the source and/or destination of data transfers are required for operation of the invention. In one embodiment utilized for data transfers in the downstream direction, object download requests can be fulfilled by sending a sequence of partial download requests through the set of communication channels being aggregated, and forwarding the resulting partial data objects received to the original requester in the proper order. In another embodiment utilized for upstream data transfers, traffic is bifurcated to travel along a set of communication channels, and the bifurcated traffic is reassembled either at the network layer or the transport layer.

32 Claims, 5 Drawing Sheets

(56) References Cited

U.S. PATENT DOCUMENTS

| | | |
|---|---|---|
| 7,269,143 B2 | 9/2007 | Datta |
| 7,292,575 B2 | 11/2007 | Lemieux et al. |
| 7,315,554 B2 | 1/2008 | Baum et al. |
| 7,332,611 B2 | 2/2008 | Turos |
| 7,406,048 B2 | 7/2008 | Datta |
| 7,444,506 B1 | 10/2008 | Datta |
| 7,482,467 B2 | 1/2009 | Turos |
| 7,510,234 B2 | 3/2009 | Ameloot |
| 7,633,894 B2 | 12/2009 | Cruz |
| 2004/0117438 A1 | 6/2004 | Considine et al. |
| 2004/0208158 A1 | 10/2004 | Fellman |
| 2005/0172199 A1* | 8/2005 | Miller et al. .......... 714/749 |
| 2005/0265364 A1* | 12/2005 | Gallatin et al. .......... 370/401 |
| 2006/0064492 A1 | 3/2006 | Hirsch |
| 2006/0084469 A1* | 4/2006 | Malone et al. .......... 455/552.1 |
| 2006/0098573 A1* | 5/2006 | Beer et al. .......... 370/230 |
| 2006/0182118 A1* | 8/2006 | Lam et al. .......... 370/395.42 |
| 2006/0187834 A1* | 8/2006 | Nichols et al. .......... 370/230 |
| 2006/0215593 A1* | 9/2006 | Wang et al. .......... 370/315 |
| 2007/0028217 A1 | 2/2007 | Mishra |
| 2007/0050487 A1 | 3/2007 | Pravat |
| 2007/0053360 A1* | 3/2007 | Hino et al. .......... 370/392 |
| 2007/0116056 A1 | 5/2007 | Cruz |
| 2007/0133567 A1 | 6/2007 | West |
| 2007/0143449 A1 | 6/2007 | Wray West et al. |
| 2007/0147244 A1* | 6/2007 | Rasanen .......... 370/231 |
| 2007/0147438 A1* | 6/2007 | Lok .......... 370/535 |
| 2007/0153807 A1 | 7/2007 | Cruz |
| 2007/0160030 A1 | 7/2007 | Cruz |
| 2007/0211633 A1* | 9/2007 | Gunawardena et al. .......... 370/232 |
| 2007/0283042 A1 | 12/2007 | West |
| 2008/0045217 A1* | 2/2008 | Kojima .......... 455/436 |
| 2008/0104278 A1* | 5/2008 | Ford et al. .......... 709/250 |
| 2008/0219281 A1 | 9/2008 | Akin |
| 2008/0267184 A1 | 10/2008 | Arisoylu |
| 2009/0156654 A1 | 6/2009 | Turos |
| 2009/0196282 A1 | 8/2009 | Fellman |
| 2009/0204723 A1* | 8/2009 | Tonsing et al. .......... 709/238 |
| 2009/0252134 A1 | 10/2009 | Schlicht |
| 2009/0310651 A1 | 12/2009 | Amde |
| 2009/0323554 A1 | 12/2009 | Arisoylu |

\* cited by examiner

ACCESS LINE BONDING AND SPLITTING METHODS AND APPARATUS

PRIORITY AND RELATED APPLICATIONS

This application claims priority to U.S. Provisional Patent Application Ser. No. 60/901,078 filed Feb. 12, 2007 entitled "ACCESS LINE BONDING METHODS AND DEVICES", which is incorporated herein by reference in its entirety. This application is also related to co-owned and co-pending U.S. patent application Ser. No. 12/110,241 filed Apr. 25, 2008 entitled "LINK AGGREGATION METHODS AND DEVICES", and U.S. patent application Ser. No. 12/491,202 filed Jun. 24, 2009 entitled "INTER-OFFICE COMMUNICATION METHODS AND DEVICES".

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates generally to the field of network communications, including Internet and intranet communications. The invention concerns in one exemplary aspect methods and devices permitting network (e.g., Internet access lines or intranet communication links) to be aggregated, thereby enabling faster communications for applications such as Internet access and intranet communication.

BACKGROUND OF THE INVENTION

Dial-up service is a common method of Internet access. Dial-up service uses a dial-up modem through which a computer makes phone calls to an Internet service provider. The dial-up modem transforms digital data from the personal computer into an analog signal for transmission through a phone line, and conversely converts incoming analog signals into digital data for the personal computer. Dial-up service is known to be relatively slow compared to newer broadband access architectures. For example, viewing web pages with multimedia content, such as graphical images, is often unacceptably slow to many users.

Broadband access addresses these problems encountered when attempting to view, e.g. multimedia content, etc., by providing higher digital data rates than dial-up service. A "DSL" (Digital Subscriber Line) involves upgrading the dial-up modem to a higher speed modem, known as a DSL modem, as well as using an upgraded modem device at the Internet Service Provider (ISP) premises, also known as the "central office." The DSL approach uses existing copper wire, possibly upgraded along certain segments to increase its capacity to carry digitized information. The DSL data is carried over the same telephone line that is already connected to the customer location, such as a business or a residential unit, and the central office that is owned and operated by the local telephone company. The DSL data is carried over a different frequency band than used for voice communications. The data rates achievable by DSL are dependent on the distance between the customer location and the central office, and commonly range roughly between 100 kbps-1500 kbps. A DSL connection is commonly called a broadband access line. Many DSL service offerings in use today are asymmetric. In particular, the data rate in the downstream direction, from the central office to the customer, is faster than in the upstream direction. This is determined by the relative widths of the frequency bands used in the upstream and downstream directions on the copper wires.

Another broadband access implementation commonly used with residential customers makes use of the coaxial cable that passes through a residential unit, for purposes of providing television signals to the home, i.e., "Cable TV". A specialized modem, called a cable or DOCSIS modem, is attached the coaxial cable inside the residential unit. The cable modem facilitates digital communication between the residential unit and facilities owned by the cable TV operator (often called a "Multiple Systems Operator" (MSO)). The MSO is attached to the Internet, and thus becomes an Internet service provider for the residential unit. The coaxial cable entering a residential unit is typically shared with other residential units in close geographic proximity. Currently, peak data rates on the order of approximately 5 to 10 million bits per second (Mbps) and beyond are commonly obtained with cable modems. As with DSL, cable Internet service is usually asymmetric in that the data rate in the downstream directions is greater than in the upstream direction. Peak data rates available in the downstream direction with cable modem technology are commonly greater than that with DSL modem technology.

Small business users may subscribe to a DSL service or a cable service for Internet access. Internet service providers may offer a "business class" DSL or cable service, which provides higher reliability and availability guarantees, as well as less aggressive statistical multiplexing (i.e. sharing of network capacity) in the backhaul network for Internet connectivity, as compared to the residential service offerings.

An older and more expensive transport technology, called T1 service, is also commonly used by businesses for Internet connectivity. The data rate available on a T1 line is approximately 1.5 million bits per second, in each direction. Though the data rate on a T1 line may be less than that available on a DSL line, often a business may prefer a T1 service for Internet access. This is because the T1 service may connect the user to a higher capacity backhaul network. Also, the signals transmitted on a T1 are more robust to interference from "crosstalk" across different twisted copper pairs, which are physically adjacent. This means that the data rate of 1.5 million bits per second is available, regardless of signal transmissions on other twisted copper pairs. It is perceived that DSL service is more sensitive to crosstalk than T1. The data rate used on a DSL line may vary dynamically according to the degree of crosstalk that exists. For these reasons, T1 service for Internet access may be preferred by a business over DSL, even though it is much more expensive. Large businesses may also use T1 lines to directly connect remote office locations, rather than for Internet access.

In order to accommodate greater data rates than available with a single Internet access service, a business may subscribe to several Internet service providers, or may subscribe to more than one instance of the same service from a single Internet service provider. In order to facilitate connectivity to several ISPs or several instances of an ISP service, a business may use a router device with a load balancing capability. Outgoing traffic from the business may be spread across the access lines, at the granularity of an end user or perhaps a TCP session. If the number of simultaneous active users in the business is large most of the time, this may be an adequate solution. However, if this is not the case, many of the access lines may be idle most of the time. For example, if a user within the business downloads a file, only one of the access lines is used to support the download, even though the other access lines are idle.

In order to make full use of access lines, physical or link layer bonding of access lines may be used, if the service is available. Typically, a user may only bond together access lines from the same service provider. DSL lines may be bonded together at the physical layer, whereby data symbols on each access line are transmitted synchronously with respect to each other, forming a virtual high-speed link from different data channels. Alternatively, DSL lines can be bonded together at the link layer for a virtual high-speed link. In this method, a data packet of the virtual high-speed link is split into fragments, one for each legacy access link. Overhead bits are added to each fragment and sent together as a packet on each legacy data link. The overhead bits are used to properly reassemble fragments into data packets of the virtual high-speed link, since they may arrive out of order, due to the variable latency possible on each link. Multi-link PPP is such a protocol that creates a virtual high-speed link out of legacy (PPP) data link channel. In both of these bonding techniques, an entity in the central office or elsewhere is needed to bifurcate traffic in the downstream direction and to reassemble traffic in upstream direction. In the case of physical layer bonding, special DSLAM line cards capable of terminating bonded DSL lines are necessary. In the case of link layer bonding, for example multi-link PPP, a separate line card or server with multi-link PPP support is needed to act as an end-point of the virtual high-speed link.

In intranet communications applications, a client device such as a laptop computer, desktop computer, or mobile phone, may have several communication interfaces. For example it may have a wired Ethernet interface and one or more wireless LAN interfaces (e.g., WiFi or IEEE Std. 802.11). For intranet communications, it may be desired to aggregate the communications resources available to the client in order to achieve faster rates of data transfer, for a given communication task such as a file transfer. The commonly known method for aggregation would be to bond the interfaces together at the physical or the link layer. In either case, an entity is needed at both the client and at the remote end of the virtual high-speed link, in order to bifurcate traffic on the different communication channels at one end of the virtual high-speed link, and reassemble traffic from the different communication channels at the other end of the virtual high-speed link, for each direction of traffic flow.

Many examples of apparatus and methods exist in the prior art to increase data transmission speeds. For example, U.S. Pat. No. 6,490,295 to Cooklev, et al. issued Dec. 3, 2002 and entitled "High-speed MODEM operating over two or more telephone lines" discloses a communication system configured to transceive a signal along multiple communication media of the communication system thereby increasing the rate at which the signal is transceived. The communication system comprises a source configured to transceive a signal. A communication apparatus configured for decomposing the signal into a plurality of manipulated signals is also disclosed. In communication with the communication apparatus is a reconstructing apparatus that is configured for reconstructing the plurality of manipulated signals into the signal, the signal being capable of being transceived by a host.

U.S. Pat. No. 6,910,149 to Perloff, et al. issued Jun. 21, 2005 and entitled "Multi-device link aggregation" discloses a multi-device link aggregation (MDLA). A first MDLA device is connected to a second MDLA device by an MDLA internal link. Each of the interconnected first and second MDLA devices is connected to at least one common link aggregation (LAG) partner device by an aggregated link, respectively. Typically, the first and second MDLA devices exchange protocol data units (PDUs) to detect devices that are connected to both the first and second MDLA devices such that they are able to trick the detected devices into behaving as though the two MDLA devices are a single device. If one of the MDLA devices fails, traffic of the associated aggregated link to the failed MDLA device can be automatically forwarded by the other non-failed MDLA device.

U.S. Pat. No. 7,002,993 to Mohaban, et al. issued Feb. 21, 2006 and entitled "Method and apparatus providing media aggregation in a packet-switched network" discloses techniques for aggregating multiple media packets to improve end-to-end bandwidth efficiency. The techniques include using an RTP aggregation protocol that is not sensitive to packet loss to aggregate multiple media packets under a single header. According to the RTP aggregation protocol, the single header for an aggregated media packet comprises a version field, a zero field, a sequence number field and a trunk ID field. The single header encapsulates the aggregated payload, which is an aggregation of Real-Time Protocol (RTP) segments. An RTP segment either has a compressed format or an uncompressed format. The uncompressed RTP segment includes the complete uncompressed RTP packet copied from the original User Datagram Protocol (UDP) packet. The compressed RTP segment includes the payload of the original RTP rather than the complete original RTP packet.

U.S. Pat. No. 7,292,575 to Lemieux, et al. issued Nov. 6, 2007 and entitled "Method and system for multi-protocol label switching (MPLS) based data flow aggregation in a third generation (3G) cellular telecommunication system" discloses a method and packet switched cellular telecommunication system wherein data flows from a terminal into one or more Multi Protocol Label Switching (MPLS) Label Switched Path (LSP) based on at least one criterion. In a first embodiment, the data flows are aggregated into LSP(s) based on a Quality of Service (QoS) class of each such data flows, by a Network Node, such as a Radio network Controller (RNC) or a Serving GPRS Support Node (SGSN). In a second embodiment, the data flows or LSPs are aggregated into another LSP(s) based on the destination routing area. The LSP aggregation is performed by an Edge Node of the routing area, such as a Gateway GPRS Support Node (GGSN). In a first variant of the 2.sup.nd embodiment, the aggregation is used for macro-mobility, while in yet another variant the same aggregation is used for defining a virtual private network.

U.S. Pat. No. 7,315,554 to Baum, et al. issued Jan. 1, 2008 and entitled "Simple peering in a transport network employing novel edge devices" describes providing simple peering in a network in which transport technology is independent of network access technology. An out-of-band network may be used to carry advertisements to an update facility. The update facility may use layer 3 destination address information and at least a part of context information (to identify customers uniquely) to determine a layer 3 address of an edge device of the transport network associated with an addressed customer device. Virtual private networks are supported, as context information is used to distinguish different customers with overlapping layer 3 addresses.

United States Patent Publication No. 20060064492 to Hirsch; filed Mar. 23, 2006 and entitled "Systems and methods for smart communication" discloses systems and methods for smart communication including a server that facilitates smart communication between users. Users involved in a communication session using a first set of devices may, for example, automatically establish a second communication session between the users, where the second communication session may be conducted using one or more other devices associated with the users.

United States Patent Publication No. 20060084469 to Malone; et al. filed Apr. 20, 2006 and entitled "Transmitter and receiver architecture for multi-mode wireless device" discloses a multi-mode wireless device having a transceiver that includes a multi-mode transmitter and a multi-mode receiver. The transmitter can include a multi-mode transmit baseband portion configured to support all of the transmit modes. Similarly, the receiver can include a multi-mode baseband portion that is configured to support all of the receive modes. The transmitter can also include a frequency conversion stage that can convert the output from the transmit baseband portion to the desired transmit frequency. Multiple power amplifiers in parallel, each configured to support one or more of the operating modes, can selectively amplify the transmit signals. The receiver can include multiple low noise amplifiers (LNAs) in parallel, each configured to selectively amplify the received signals of one or more of the operating modes. The output of the LNAs can be coupled to a frequency conversion stage that downconverts the received signals and provides them to the baseband portion.

United States Patent Publication No. 20060215593 to Wang; et al. filed Sep. 28, 2006 and entitled "Distributed Multichannel Wireless Communication" discloses systems and methods that facilitate distributed multichannel wireless communication and provide the highest level quality of service ("QoS") guarantee and support extremely high bandwidth applications such as voice over internet protocol ("VOIP") streaming audio and video content (including high definition) as well as multicast applications while also supporting convergent networks, ad hoc networks, and the like. A modular MAC architecture provides a group of nodes with the ability to simultaneously communicate with each other using multiple separate communication channels during the same timeslots. The additional throughput gained by employing multiple communication channels is amplified by dynamically mapping the communication channels and timeslots in a network so that multiple channels can be reused simultaneously throughout the network during the same timeslot in a fashion that does not create collisions.

Despite the foregoing, improved methods and apparatus for aggregating a plurality of communication channels in a communication network is needed. Ideally, such methods and apparatus would provide for aggregated transmission in a transparent manner. That is, such apparatus and methods could be implemented in communication with an originating device and a destination device with neither of the devices being aware that communication is provided over two or more separate communication channels. Ideally such improved methods and apparatus could be implemented without requiring modifications to either the destination device or the originating device and would provide a significant benefit in terms of inter alia not having to modify or retrofit the network or server in any way.

SUMMARY OF THE INVENTION

In a first aspect of the present invention a method of aggregating a plurality of communication channels in a communication network is disclosed. In one embodiment, the method comprises classifying a plurality of packets that arrive on a first communication interface as belonging to a single communication session; selecting one of a plurality of network interfaces that will be associated with the single communication session; forwarding a first packet received on the first communication interface to the selected network interface associated with the single communication session that the first packet belongs to; updating a source network address of the first packet with the network address associated with the selected network interface; and forwarding a second packet received on the selected network interface for transmission onto the first communication interface, wherein the destination network address of the second packet is replaced by the source network address associated with the single communication session that the second packet belongs to. In another embodiment, the act of selecting is based on varying levels of a packet security parameter.

In another embodiment, the method comprises requesting a plurality of data via a first communication interface, where the first communication interface is in communication with a first and a second network interface. The plurality of data comprises a first data object and a second data object. The method further comprises receiving the first data object at the first network interface; receiving the second data object at the second network interface; and forwarding the first and second data objects to the first communication interface. In one embodiment, selection of the first and second network interfaces is performed using a load balancing algorithm. In yet another embodiment, the load balancing algorithm comprises a round robin load balancing algorithm. In still another embodiment, the load balancing algorithm comprises an optimization algorithm adapted to optimize for higher bandwidth channels. In still another embodiment, the load balancing algorithm accounts for a quality of service (QoS) parameter.

In yet another embodiment, the method comprises classifying a first plurality of packets that arrive on a first communication interface as belonging to a single communication session, wherein the single communication session represents a data transfer in the upstream direction. The method further comprises dividing a first packet received on the first communication interface belonging to the single communication session into a plurality of fragments; and forwarding a first fragment of the plurality of fragments over a first network interface and forwarding a second fragment of the plurality of fragments over a second network interface.

In a second aspect of the invention, apparatus for aggregating communication channels in a packet based communication network according to the various methods of the first aspect of the invention is disclosed. In one embodiment, the apparatus is embedded within a client device. In another embodiment, the apparatus comprises a stand alone hardware device. In yet another embodiment, the apparatus is embedded within a modem. In yet another embodiment, the apparatus is embedded within a router. In still another embodiment, the apparatus is embedded within a mobile device (e.g., PDA or cellular telephone). In still another embodiment, the apparatus utilizes a power consumption parameter to select one of a plurality of network interfaces.

In one variant, the aggregator apparatus comprises a computer (e.g., PC, laptop, handheld, etc.). In another variant, the aggregator comprises a mobile device (e.g., cellular telephone). In still another variant, the device comprises a set-top box (STB) for use in, e.g., a satellite network.

In yet another embodiment, the apparatus comprises a process, wherein the process comprises: receiving a request for a plurality of data via a first communication interface from a computing device, the plurality of data comprising a first data object and a second data object and belonging to a single communication session; forwarding the first data object request to a first network interface; forwarding the second data object request to a second network interface; receiving the first data object at the first network interface; receiving the second data object at the second network interface; and forwarding the first and second data objects to the first communication interface.

In one variant, the computing device is unaware of the acts of receiving the first and second data objects at the first and second network interfaces, respectively. In yet another variant, the computing device is unaware of the acts of forwarding the first and second data object requests to the first and second network interfaces, respectively.

In yet another embodiment, the aggregator device comprises a portable device. The portable device may optionally be battery powered or alternatively powered by a wired or wireless power source. In one embodiment, the communication channels in the portable device will be provided by different mobile wireless broadband data services. Advantageously, the communication channels 41, 42 may be obtained from different communication carriers that will provide a communication service through the local port to an end user device which is higher performing and has better geographical coverage than would be otherwise available through any single communications carrier. The local port in may comprise a wireless interface, or alternatively may comprise a wired interface.

In a third aspect of the invention, a system for aggregating communication channels in a packet based communication network is disclosed. In one embodiment, the packet based communication network comprises the Internet. In another embodiment, the packet based communication network comprises an intranet.

In a fourth aspect of the invention, a proxy architecture is disclosed. In one embodiment, the architecture comprises an aggregator acting as a proxy for the data transfer request, transforming data transfer requests for comparatively large objects into a series of smaller data (chunk) transfer requests that are made through two or more network interfaces, and passing data chunks received over the different network interfaces, through to the original requestor (e.g., on a local port) in a prescribed order.

In a fifth aspect of the invention, a computer-readable medium is disclosed. In one embodiment, the medium comprises a storage device adapted to store at least one computer program comprising an aggregation balancing or allocation algorithm adapted for use in a network. In one variant, the medium comprises a computer hard disk (HDD). In another variant, the medium comprises an optical device. In yet another embodiment, the medium comprises a USB key. In still another embodiment, the medium comprises a computer (e.g., flash) memory.

In a sixth aspect of the invention, a method of avoiding the enactment of a false congestion avoidance mode of a transmitting source device is disclosed. In one embodiment, the method comprises forwarding a plurality of data packets from a local port over a plurality of network interface ports; receiving an acknowledgment message comprising a sequence number at one of the plurality of network interface ports; determining whether the sequence number is identical to a previously received acknowledgment message; and selectively discarding the acknowledgement message so as to avoid the transmitting source device from unnecessarily entering a congestion avoidance mode.

In another embodiment, the act of selectively discarding the acknowledgment message is performed utilizing a timer mechanism.

In yet another embodiment, the act of forwarding comprises: classifying the plurality of data packets that arrive on the local port as belonging to a single communication session; selecting one of the plurality of network interfaces that will be associated with the single communication session; forwarding a first packet associated with the single communication session to a first of the plurality of network interface ports; updating a source network address of the first packet with the network address associated with the first network interface port; and forwarding a second packet associated with the single communication session to a second of the plurality of network interface ports, wherein the source network address of the second packet is replaced by the source network address associated with the first network interface port.

In yet another embodiment, the method further comprises analyzing the timing of the receipt of the acknowledgement message and the previously received acknowledgment message so as to determine whether: (1) the acknowledgment messages are related; or (2) the acknowledgment messages indicate a congestion condition.

In a seventh aspect of the invention, methods of doing business are disclosed which implement various aspects of the above-mentioned methods and apparatus.

In an eighth aspect of the invention, network apparatus for use in a packetized data network and, adapted to selectively utilize two or more available and substantially heterogeneous communication channels for communicating data associated with a single communications session so as to enhance the cost efficiency of said session is disclosed.

In a ninth aspect of the invention, a computer-readable apparatus is disclosed. In one embodiment, the apparatus comprises a storage medium adapted to store a computer program comprising a plurality of instructions which, when executed on a digital computer, provide for aggregation of a plurality of different packetized network interfaces in order to enhance cost efficiency for a user.

Figure 1:
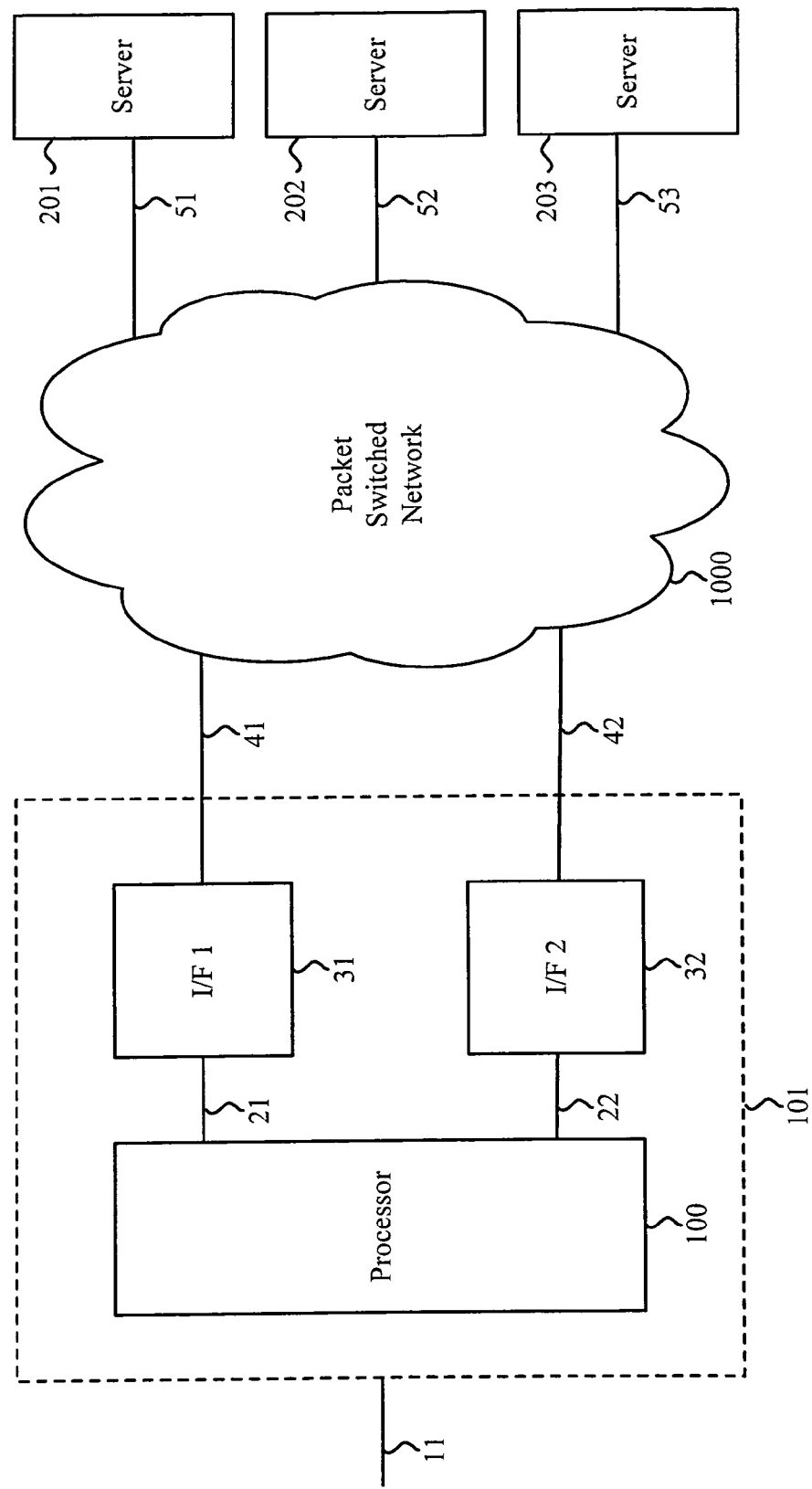
FIG. 1 is an illustration of a device implementing methods in accordance with the invention, whereby device aggregates multiple communication channels in order to communicate with other devices through a packet switched network.

All figures© Copyright 2007-2008 Mushroom Networks, Inc. All rights reserved.

DETAILED DESCRIPTION

Reference is now made to the drawings wherein like numerals refer to like parts throughout.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include without limitation any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "digital subscriber line" (or "DSL") shall mean any form of DSL configuration or service, whether symmetric or otherwise, including without limitation so-called "G.lite" ADSL (e.g., compliant with ITU G.992.2), RADSL: (rate adaptive DSL), VDSL (very high bit rate DSL), SDSL (symmetric DSL), SHDSL or super-high bit-rate DSL, also known as G.shds1 (e.g., compliant with ITU Recommendation G.991.2, approved by the ITU-T February 2001), HDSL: (high data rate DSL), HDSL2: (2nd generation HDSL), and IDSL (integrated services digital network DSL), as well as In-Premises Phoneline Networks (e.g., HPN).

As used herein, the term "Ethernet" refers generally to local area network technology; including that now specified in a standard IEEE 802.3 and related standards.

As used herein, the term "integrated circuit (IC)" refers to without limitation any type of device, whether single or multiple die, having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "Internet Protocol" or "IP" refers generally to the format of packets, also called datagrams, and/or an addressing scheme, such as without limitation those described in inter alia, RFC 791 and 2460. IP may be used as an identifier for a computer or device on a TCP/IP or comparable network; e.g., such as networks using TCP/IP route messages based on the IP address of the destination.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor", "processor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the term "network" refers generally to any type of telecommunications or data network including, without limitation, data networks (including MANs, WANs, LANs, WLANs, internets, and intranets), hybrid fiber coax (HFC) networks, satellite networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network entity" refers to any network entity (whether software, firmware, and/or hardware based) adapted to perform one or more specific purposes. For example, a network entity may comprise a computer program running in server belonging to a network operator, which is in communication with one or more processes on a CPE or other device.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "protocol" refers generally to a standard format agreed upon for communication between entities, such as distributed systems within a network. Examples of protocol include (Transmission Control Protocol (TCP), Internet Protocol (IP), TCP/IP, Hypertext Transmission Protocol (HTTP), Session Initiation Protocol (SIP), Real Time Transport Protocol, Real Time Control Protocol (RTP/RTCP), etc.)

As used herein, the term "server" refers to any computerized component, system or entity regardless of form which is adapted to provide data, files, applications, content, or other services to one or more other devices or entities on a computer network.

As used herein, the term "TCP/IP" refers generally to Transmission Control Protocol/Internet Protocol, the suite of communication protocols used to connect hosts on the Internet.

As used herein, the term "WiFi" refers to, without limitation, any of the variants of IEEE-Std. 802.11 or related standards including 802.11a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one fundamental aspect, the present invention details methods and apparatus for aggregating a plurality of communication channels and/or networks to improve the speed and reliability of networked connectivity between computing devices. The present invention also seeks to provide these benefits while minimizing the drawbacks associated with their implementation by essentially making the implementation of the aforementioned methods and apparatus transparent to the pre-existing network architecture. The present invention in effect intercepts data traffic associated with a network and redistributes that traffic based on any number of considerations, including without limitation, load balancing concerns, quality of service considerations, cost and the like. Further the apparatus and methods of the present invention also detail associated algorithms and apparatus that manage pre-existing mechanisms associated with the network that attempt to address connectivity considerations such as congestion avoidance. Details associated with the implementation of these methods and apparatus are now described in detail.

Methods of Doing Business

An aggregation device in accordance with the principles of the present invention may provide for accelerated network connectivity in a cost-effective way to small and medium size businesses, enterprises, apartments, hotels, hospitals and other Multi-tenant buildings who wish to aggregate multiple Internet access lines for increased performance and reliability. Accordingly a method of doing business is envisioned. With an aggregation device, multiple DSL, cable modem, T1 services, etc. can be combined to provide accelerated and more reliable Internet access (via redundancy and the like). The Internet access speeds provided by the aggregation device may, in certain geographical areas, not even be available from the service provider. It has been noted by the assignee of the present invention that the total subscription costs of multiple Internet access lines are often substantially less than a single high-speed Internet access line possessing equivalent bandwidth. Accordingly, the aggregation device, in many application scenarios, provides quick Return on Investment (ROI) and lower operating expenses for a variety of customers. In some instances, the payback period on the investment of an aggregation device by a customer is often less than 6 months.

Exemplary Embodiments of Apparatus

The invention is described relative to the exemplary configuration of FIG. 1. An aggregation device 101 is connected to a network (e.g., a packet switched network 1000) through a plurality of communication links 41, 42. Further, while two (2) communication links 41, 42 are shown in FIG. 1, it is recognized that three (3) or more communication links could be utilized if desired. Moreover, these links need not be separate physical links, but may in fact comprise virtual links or channels of the type know in the digital communications arts. Additionally, it will be appreciated that the links 41, 42 need not be direct links, but in fact may comprise indirect links (e.g., may be routed through one or more intermediary devices or processes, or even other networks), and may be either wireline or wireless in nature.

Other devices, represented in the illustration as servers 201, 202, 203, are connected to the packet switched network 1000 through their respective communication links 51, 52, 53. The aggregation device 101 is adapted to provide network communications to devices that are connected to the aggregation device 101 via a communications port 11, to other devices such as those devices 201, 202, 203 connected to the packet switched network 1000. Throughout this disclosure and for purposes of illustration, we assume that the destination device is the server labeled as 201, however it is recognized that the destination device may comprise literally any number of devices whether alone or in combination that are connected directly or indirectly to the packet switched network 1000.

The communication links 41 and 42 are aggregated together by the aggregation device 101 to communicate with other devices connected to the packet switched network, and hence the name aggregation device. By aggregating the communication links together, greater data transfer rates can be achieved in both the upstream and downstream direction, versus communication over a single communication link. This functionality is described in greater detail subsequently herein.

In the embodiment illustrated in FIG. 1, there are only two communication links 41, 42 that the aggregation device 101 can use for communication with other devices connected to the packet switched network 1000. Utilizing a conventional approach to aggregate the communication channels, it might be desirable to employ an aggregating type device within the packet switched network 1000 itself, and another aggregating type device within a destination device, such as device 201. Therefore, for a given data transfer, a first aggregation type device will bifurcate the data traffic so that it is spread across a plurality of communication channels, and a second aggregation type device would reassemble the bifurcated traffic back into a single data stream. The two aggregation type devices would thus work together to form a virtual high-speed communications link between them. Utilizing this approach, the device connected to the local port 11, and the device that it is communicating with, for example the device 201, is not aware that communication is being provided over two or more separate communication channels. As a result, no changes to the device connected to local port 11 are required to support the communication over two separate communication channels. In the case where the similar aggregation device is deployed within the packet switched communication network 1000, no change is required in the destination device 201 in order to support the communication over two separate communication channels. In the case where the similar aggregation device is deployed within the destination device 201, no change is required within the destination software application within the destination device 201.

Contrast the foregoing approach with another exemplary method of the present invention, where advantageously there is no such similar aggregation type device that is necessary to deploy in the packet switched network 1000 or in the destination device 201. Rather, the aggregation device 101 of FIG. 1 is solely responsible for aggregating the communication channels 41, 42. The aggregation device 101 provides for transparent data transport, i.e. the device connected to the local port 11, and the destination device 201, are not aware that communication is provided over two separate communication channels 41, 42. In the context of the present invention, the term local port 11 refers to the fact that the device transmitting or receiving data will tend to be more physically proximate to the aggregation device 101 then the destination device, although it is recognized in certain embodiments that this is not necessarily a requirement. Regardless, there are no modifications required in either the destination device 201 or in the device connected to the local port 11 in order to support the communication using the separate communication channels 41, 42. This provides a significant benefit in terms of inter alia not having to modify or retrofit the network 1000 or server 201 in any way, eliminating many barriers to the implementation of the aggregation device 101.

Figure 1A:
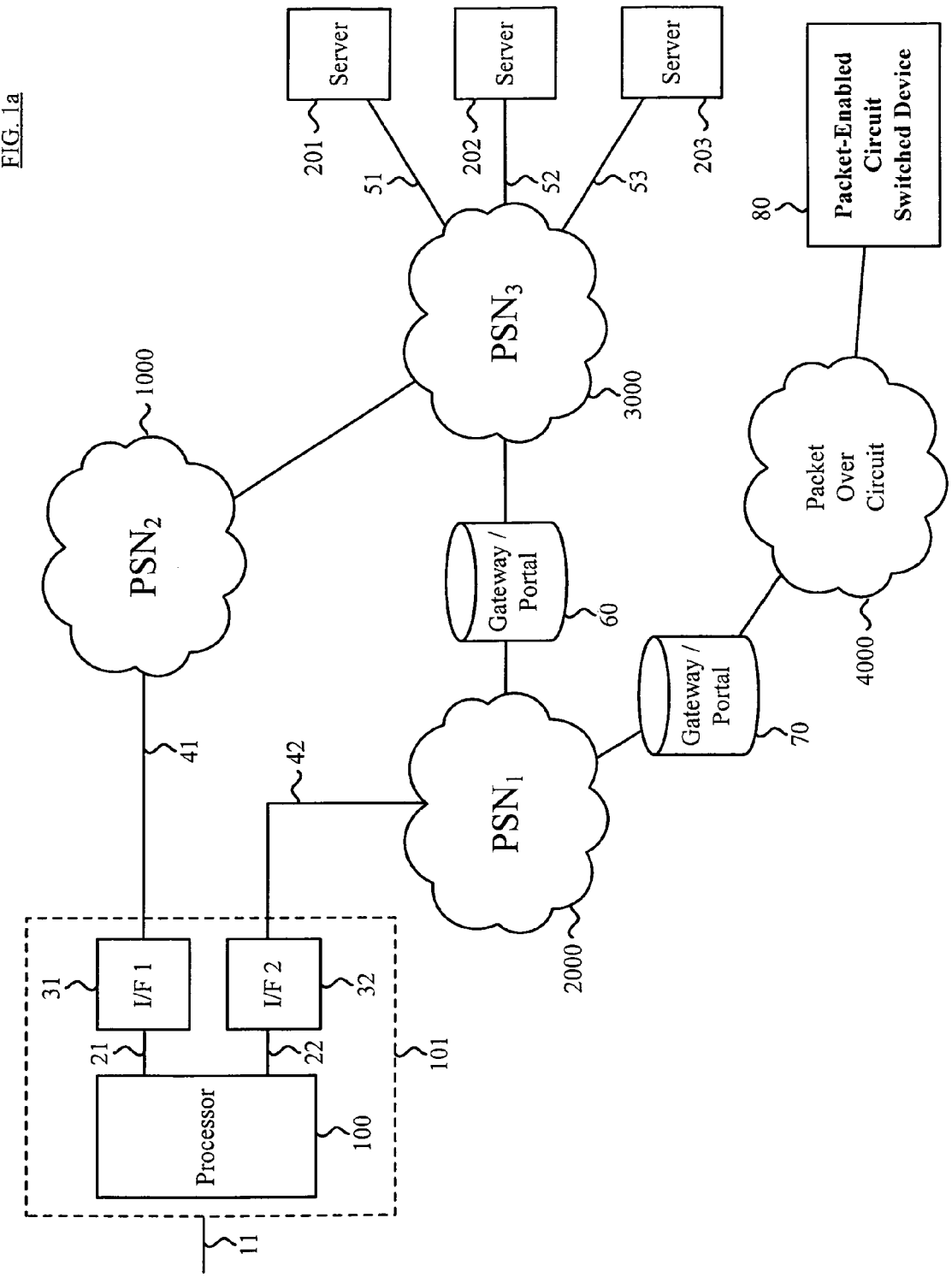
FIG. 1a is an illustration of a device implementing methods in accordance with the invention, whereby device aggregates multiple communication channels over various packet switched and packet over circuit networks.

Referring now to FIG. 1a, an alternative configuration of the invention is shown and described in detail. In the embodiment illustrated in FIG. 1a, the aggregation device is coupled via two communication channels 42, 41 to a first and a second packet switched network 2000 and 1000 respectively. The second packet switched network 1000 is coupled to a third packet switched network 3000 which is coupled to a plurality of destination devices 201, 202, 203 via respective communication links 51, 52 and 53. The third packet switched network 3000 is coupled to the first packet switched network 2000 via a gateway 60. The first packet switched network 2000 is also coupled to a packet over circuit network 4000 via a second gateway 70. Coupled to the packet over circuit network 4000 is a packet-enabled circuit switched device 80 which can now communicate with the aggregation device 101 which can also simultaneously communicate with one or more of the destination devices 201, 202, 203. In this manner, the device 101 of the present invention may communicate with any number of devices via a plurality of similar and differing network architectures.

Example Application Scenarios

The present invention may be utilized in any number of exemplary networking applications. In a first example application, called herein the "ISP application," the packet switched network 1000 represents the Internet. The aggregation device 101 will comprise a separate hardware, firmware and/or software device deployed by an individual or a business in order to aggregate two or more Internet access lines. For example, the aggregation device 101 may comprise in one variant the Truffle™ Broadband Bonding Network Appliance (BBNA) or the APX10 Access Point Aggregator designed and manufactured by the Assignee of the present disclosure. The local port 11 may comprise for example a wired Ethernet LAN port or other network interface, and the communication channels 41, 42 comprise wired Ethernet connections or other interfaces to modulator/de-modulator devices such as two or more DSL modems that are connected to the Internet. The destination devices 201, 202, 203 may respectively comprise computing devices ubiquitous in the computing arts such as file servers, web servers, remote personal computers, etc, which the individual or business wishes to communicate with.

In another exemplary embodiment the aggregation device 101 may be embedded within an Internet router deployed by a business that wishes to employ two or more broadband lines (e.g. DSL) for Internet connectivity. In yet another exemplary embodiment, the aggregation device 101 may be integrated with two or more broadband access devices (such as legacy DSL modems, cable modems, etc.), with the aggregation device 101 itself operating with the same functionality as a broadband modem. The communication channels 41, 42 may represent, inter alia, DSL lines (i.e. twisted copper pairs running from an individual or business to a central office or "CO" or to a remote terminal of the communication carrier providing the DSL service).

In yet another exemplary embodiment, hereinafter referred to as the "home intranet application," the packet switched network 1000 comprises a data network implemented inside of a consumer's residence. The aggregation device 101 may comprise a separate hardware device (such as a PMCIA card, USB key, etc.) that plugs into, for example, a laptop computer or a desktop computer. In this case, the local port 11 represents a PMCIA bus connector and the aggregation device 101 acts as a network interface card that aggregates two separate network connections. The network connections 41, 42 might be wireless LAN connections, or wired Ethernet connections, or a combination of both. In the home intranet application, the destination devices 201, 202, 203 might represent any number of devices utilized in a home intranet application such as a desktop or laptop computer, a television set-top box, a video game console, personal media device (PMD), etc.

In yet another embodiment in e.g. a home intranet application, the aggregation device 101 may be embedded within a laptop or handheld computer or a desktop, known as a client. In this case, the local port 11 may be an internal software port of the client. The communication links 41, 42 might represent wireless LAN connections or wired LAN connections that are emanating from the client as previously discussed. In this case, as would be appreciated by one of ordinary skill, the methods of the invention discussed herein may be implemented entirely in software within the client. This client may be resident on the host device, or alternatively on another device in data communication with the host (via e.g., a high speed serialized interface such as USB or Firewire). It may also be downloaded and installed to the host (such as by a network operator), or disposed on the host in any number of other ways (e.g., CD-ROM, at time of manufacture, etc.).

In yet another exemplary embodiment, the aggregation device 101 may be a portable battery powered device (such as the exemplary "Portabella BBNA" manufactured by the Assignee hereof). In one embodiment, the communication channels 41, 42 in the portable battery powered device will be provided by different mobile wireless broadband data services. Advantageously, the communication channels 41, 42 may be obtained from different communication carriers (e.g. Sprint, Verizon, ATT, etc.). In this case the aggregation device 101 will provide a communication service through the local port 11 to an end user device which is higher performing and has better geographical coverage than would be otherwise available through any single communications carrier. The local port 11 in this embodiment may comprise a wireless interface such as a WiFi interface, or alternatively may comprise a wired interface such as an Ethernet interface. The portable device embodiments discussed previously above have a wide number of varying applications, including emergency response, law enforcement, limousines, kiosks, construction site communications, etc. More generally, the above mentioned portable device embodiment is useful anywhere a fast and reliable portable network connection (i.e. wireless) is needed.

Components of Aggregation Device

For purposes of clarity in describing the present invention, the exemplary embodiment of the aggregation device 101 can be thought of as comprising a local port 11, a processor 100, a link 21 to a first network interface 31, a second link 22 to a second network interface 32, a communication link 41 for the first network interface 31, and a second communication link 42 for the second network interface 32. Both external interfaces in this embodiment have an associated network level address and a link (MAC) layer address, although other network addressing schemes may be used as well. The device may also include any number of other components (not shown) including tuners and demodulator/decryptors for interface with a cable RF (e.g., HFC) network, digital processor(s), storage device/memory, and a plurality of interfaces (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 1 for simplicity) are various software processing layers as well as media processors and other specialized SoC or ASIC devices. These additional components and functionality are well known to those of ordinary skill in the cable and embedded system fields, and accordingly not described further herein.

The aggregator 101 may also be provided with e.g., Java-based middleware which, inter alia, manages the operation of the device and applications running thereon (including the client process previously described). It will be recognized by those of ordinary skill that myriad different device and software architectures may be used consistent with the tuning functions of the present invention, the device of FIG. 1 being merely exemplary.

System Operation Downstream Data Transfers

We first describe one embodiment of how the aggregation device 101 works to aggregate the communication links 41, 42 for data transfers in the downstream direction, i.e. data transfers originating from one or more destination devices 201. A key observation is that data transfers in the downstream direction are almost always "pull"-based, rather than "push"-based. In other words, the recipient requests the data transfer from the source, rather than the source transferring the data to the recipient in an unsolicited manner. It will be appreciated, however, that while described primarily in the context of a "pull", the invention is in no way so limited, and may also be implemented within "push" paradigms, such as e.g., an exemplary WAP push of the type well known in the wireless arts.

Many applications of data downloading generate bursts of data downloads for data objects which are typically downloaded in parallel. For example, in an exemplary web browsing application, a user may request to view a web page. The web page might have several objects (e.g. multimedia objects, text, etc.), and the user's web browser translates the page request into several download requests, one for each object. The individual objects of the web page may be located on different remote servers, and often all of the download requests for the individual objects of the web page may be issued before the requested objects arrive at the web browser. As a result, the objects are effectively downloaded in parallel. For such applications, the aggregation device may simply forward data download requests received on the local port 11 through one of the communication links 41 or 42. In this case, the source device of the object download request, say device 201, believes the object was requested by one of the network interfaces, 31 or 32, since the value of the source address in the object download request is either the network address of interface 31 or the network address of interface 32. The aggregation device 101 can forward a sequence of data download requests for different objects according to an algorithm that attempts to, inter alia, evenly distribute load across the communication links 41, 42. In one embodiment, the aggregation device 101 may forward object download requests through the communication links in a round-robin type manner. In another embodiment, if one of the communication links 41, 42 has a faster data rate than the other, it may be desirable to forward object download requests at a higher rate through the faster communication link.

In another embodiment, the aggregation device 101 may forward object download requests of one type exclusively through one of the communication links. This could be useful for example, in object transactions that require differing levels of security. One communication link may be equipped with a firewall, encryption capability, a physically secure (e.g., protected) link to the network, VPN capability, IEEE-Std. 802.1x/WPA2, WTLS, or other means of providing additional layers of security to the object transaction and hence, data objects of that type may be funneled exclusively through that secure communication link.

Similarly, different links or interfaces might impose different QoS (quality of service) or forward error correction (FEC) algorithms (such as Turbo coding, Reed-Solomon, or Viterbi), and hence may be selectively allocated on this basis as well.

Similarly, the device 101 may also selectively route certain types of data (e.g., packets or other data structures according to a prescribed protocol) through one of the links as opposed to another. The selected route may be chosen based on data requirements for throughput, latency, total download speed, robustness of linkage, lossiness of data transmission, security and/or requirements for different physical layer methods (e.g. QPSK, 16 QAM, etc.). In one embodiment, traditionally high-bandwidth data can be passed over one interface and lower bandwidth data over the other, such as in multimedia or gaming applications where the indigenous processing requirements for the different types of data are heterogeneous. Coded or encrypted data may be segregated in this fashion as well; e.g., MPEG2 on one interface, MPEG4 on another interface, etc.). Myriad variations on this basic theme of selectively allocating data to (or receiving from) one or more of a plurality of interfaces will be recognized by those of ordinary skill provided the present disclosure.

In another embodiment, the device 101 may selectively allocate certain types of data through one of the links as opposed to another in order to perform an additional processing function within the aggregator device 101 itself that may not necessarily be available if allocated to another of the links.

In the case where the packet switched network represents the Internet and utilizes a protocol such as the ubiquitous IP protocol, the network addresses of the various entities are known as IP addresses. Data objects may be transported using, for example, the TCP protocol. A TCP session may be opened for each data object transfer, and the aggregation device 101 may detect SYN packets in order to recognize the data download requests. A SYN packet arriving on the local port 11 may simply be forwarded through a link 21 or 22 to the chosen network interface. In this case the processor 100 within the aggregation device 101 keeps a record of which network interface a particular SYN packet was forwarded on, so that all traffic arriving on the local port 11 that is associated with SYN packet and the object download request is forwarded through the same network interface. Such traffic associated with the same download request is commonly called a "flow," and data packets belonging to the same flow have the same source IP address, source port, destination IP address, destination port, and protocol ID. This can be used to identify packets belonging to the same flow. When a data packet from a given flow arrives on the local port 11, the value of the source IP address field is overwritten by the aggregation device with the value of the IP address belonging to the selected network interface where the SYN packet was sent though. Conversely, when a data packet from a given flow arrives on a network interface, the value of the destination IP address is overwritten with the value of the source IP address used in the original SYN packet that started the flow. Using this mechanism, as far as the remote device 201 is concerned, the requestor of an object is the chosen network interface of the aggregation device 101. Similarly, the device attached to the local port 11 is not aware of the redirection download requests by the aggregation device 101 to a chosen network interface, 31 or 32.

Figure 2:
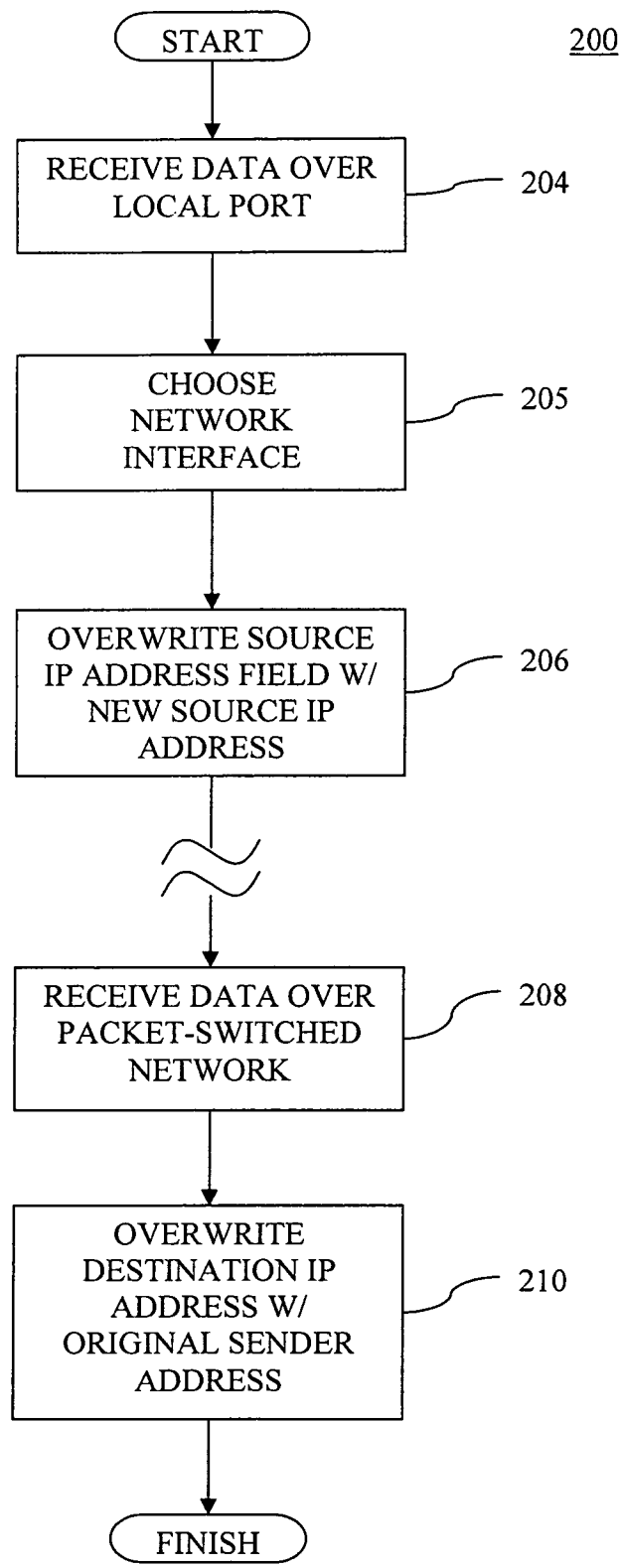
FIG. 2 is a logical flow diagram illustrating a first exemplary method of overwriting IP address fields in accordance with the principles of the present invention.

An exemplary method for illustrating such a process flow 200 is illustrated at FIG. 2. The process flow 200 of FIG. 2 starts with receiving data over a local port 11 at step 204. At step 205 the processor 100 of the device 101 utilizes an algorithm to choose a network interface 31, 32 for use with the data transfer. At step 206, the received data comprises a source IP address associated with the originating device located over the local port 11 is overwritten with a new source IP address associated with the chosen network interface 31, 32. The data is then transmitted over the chosen network interface. Data received in response to this data being sent is then received over the network at the chosen network interface at step 208. The processor 100 implements an algorithm to overwrite the destination IP address of the received data with the address of the originative device coupled to the local port 11. In this manner, data sent and received via the aggregation device 101 is transparent to the originating device.

In some embodiments, the packet format utilized is handled by the aggregator based on network layer format requirements chosen per data stream. In one embodiment, the network layer format requirements may be pre-stored in memory on the aggregation device 101. In another embodiment, the network layer format requirements may be queried from the network 1000 by the aggregation device 101. In yet another embodiment, the network layer format requirements may be queried from the device connected over the local port 11 by the aggregation device 101. In yet another embodiment, the network layer format requirements may be queried from the destination device 201 by the aggregation device 101.

The aggregation device 101 can also obtain information regarding attributes of the requested data object by interpreting semantics within the file transfer protocol. In particular, by examination of the data packets arriving on the local port 11, the aggregation device 101 can determine the size of the requested object in a download request. For data objects smaller than a threshold, all of the traffic associated with the data transfer can be redirected by the processor 100 to a single network interface, according to the method described above. For data objects larger than the threshold, the aggregation device 101 may choose to use both network interfaces 31, 32 in order to download the file, if possible.

Figure 3:
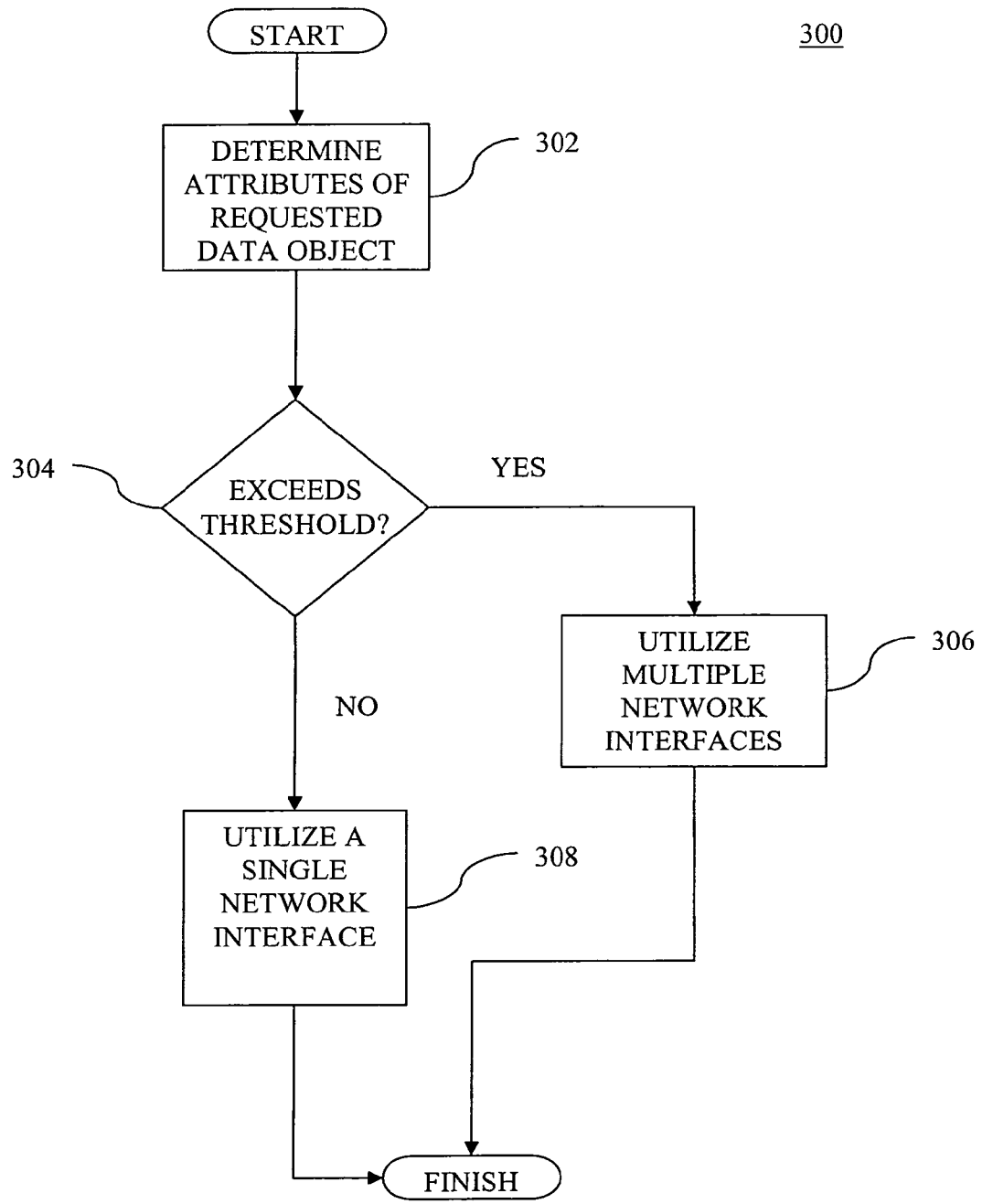
FIG. 3 is a logical flow diagram illustrating a first exemplary method of determining whether to use multiple network interfaces for data communication in accordance with the principles of the present invention.

An exemplary method 300 of implementing the aforementioned threshold algorithm is illustrated at FIG. 3. At step 302, attributes associated with the requested data object are determined. At step 304, it is determined whether or not the requested data object attributes exceed a predetermined threshold. If the attributes exceed the threshold, multiple network interfaces are utilized for the data object request at step 306. If not, a single network interface is utilized at step 308.

For such large data objects, the processor 100 handles a download request arriving on the local port 11 as follows. Many file servers support a feature called "ranging," and the aggregation device 101 can determine if the object of a download request is "range-able." If so, the aggregator device 101 uses both network interfaces 31, 32 to transfer the data object as follows. The processor 100 issues new download requests for different segments, or different "ranges," of the data object, called "chunks." Thus, different parts of the requested data object are transferred through separate network interfaces, and it appears to the remote device 201 that different parts of the data object are being requested by different network interfaces 31, 32. Regardless of the order in which requested data arrive to the aggregator device 101 from the packet switched network 1000, the requested data must be presented to the original source of the download request on the local port 11 in the same order it would be presented had it been transferred over a single network interface. Thus, the processor 100 uses a memory or storage device (such as a FIFO, queue or other buffer) to store requested data chunks arriving out of order from the packet switched network 1000. The aggregation device 101 can balance the load over the network interfaces 41, 42 in a dynamic manner, depending on the instantaneous data transfer speed observed on each network interface. For example, if an outstanding requested chunk takes longer to download than a given threshold, the requested transfer of the chunk can be aborted and the same chunk can be re-requested though a different network interface. Alternatively, if the requested data is considered "lossy" (such as e.g., where QoS considerations are less critical, as in certain VoIP or other applications where the loss of some data is not fatal), the chunk can be merely discarded. If the speeds of the network interfaces are different, in order to balance load and minimize total download time for the object it is desirable to transfer a larger fraction of the data object through the faster network interface.

The assignment of chunks to network interfaces can be performed dynamically (such as via e.g., a software or other control/allocation process running on the device 101), in order to appropriately balance the load on the communication links 41, 42. In one embodiment, data chunks that arrive to the aggregation device 101 from the packet switched network 1000 out of order are temporarily stored within a memory buffer inside the processor 100, and ultimately delivered over the local port 11 in the correct order (via, e.g., a packet or frame sequence number, timing information, or other approaches well known in the digital communications arts) at the earliest possible opportunity. In effect, the aggregation device 101 acts as a proxy for the data transfer request, transforming data transfer requests for large objects into a series of smaller data (chunk) transfer requests that are made through the network interfaces 31, 32, and passing data chunks received over the different network interfaces 31, 32, through to the original requester on the local port 11 in the correct order. Since different chunks may be transferred across the network interfaces in parallel, the total transfer time for the requested data object may be much smaller than it would be if only a single network interface was used for the data transfer.

If the processor 100 determines that the size of a data object requested for download on the local port 11 is above the threshold (or meets another criterion used for evaluation), but that the data object is not range-able, the processor can simply forward all of the traffic associated with the data transfer through a single network interface, as in the case for sufficiently small data objects discussed above.

Downstream data transfers can also be redundantly assigned to two or network interfaces 31, 33 simultaneously to improve data transfer speeds for objects sensitive to QoS considerations. In this manner, the aggregator device 101 can discard packets received over both network interfaces which are redundant. However, if data packets are lost over one communication link 41 while received at the other 42, then the aggregator device 101 can ignore known signaling messages that are indicative of congestion which might adversely impact data download speeds on the communication link 41 which lost the packet, etc. A general discussion of the methods and apparatus for ignoring congestion signaling messages are discussed subsequently herein below.

System Operation Upstream Data Transfers

For data transfers in the upstream direction, e.g., where the initiator of data transfer is the destination device 201, the exemplary aggregation device 101 can choose a single network interface (such as I/F 31) to facilitate the data transfer in the upstream direction for packets belonging to the same flow. Thereafter, data packets from a given flow arriving on the local port 11 can be spread across the different network interfaces 31, 32 according to any number of load-balancing or allocation algorithms. For example, a first exemplary load-balancing algorithm may wish to route a larger fraction of data packets from a flow over the network interface which is capable of faster communication with the destination device 201, as previously discussed.

Recall that with the exemplary embodiments of the invention, there is no need for a similar aggregation device in the packet switched network 1000 or remote device 201 that acts as a peer to the aggregation device 101. In fact, as previously discussed, the remote device 201 is unaware that the upstream data transfer is taking place in parallel over different communication links 41, 42, and so it is necessary to arrange matters so that data packets arrive to the remote device 201 in an appropriate manner that will be indistinguishable from the manner in which they would arrive had the transfer taken place over a single communication link, either 41 or 42. Two methods are disclosed for upstream data transfer, namely network layer reassembly and transport layer reassembly. We describe the methods in terms of the Internet protocol, and where the network layer corresponds with IP, and the transport layer corresponds with TCP. It is recognized however that one of ordinary skill could apply the presently disclosed principles to any number of different networking architectures.

Upstream Data Transfers with Network Layer Re-assembly

The exemplary IP networking protocol (as well as other protocols) has a feature to support the fragmentation of IP packets within a network, with re-assembly at the destination device of fragments belonging to the same original IP packet. The fragmentation feature was initially motivated by transport of packets through heterogeneous networks, which in general may have different limitations as to the maximum size of packets that can be transported over the links which comprise the network. An incoming IP packet to a network may be too large to be carried natively by the network, so the IP protocol specification allows an IP packet to be fragmented, i.e. divided into smaller pieces, en-route to its destination. Special control bits within an IP packet indicate if the packet is a fragment of a larger packet, and are used for proper reassembly at the destination of all the fragments belonging to the original packet.

As a result of this mechanism, almost all legacy IP devices have the embedded capability of reassembling IP packet fragments that are ultimately destined for the IP device. The present invention advantageously leverages this extant capability by using this re-assembly feature at the destination device 201 for supporting parallel data transfers over different communication links. In particular, the aggregation device 101 first identifies IP packets arriving on local port 11 which belong to the same flow for an upstream data transfer. For each such IP packet belonging to a given flow, the IP packet is split into two fragment IP packets and each fragment is forwarded separately over a different network interface 31 or 32 to the destination device 201. The value of the source IP address field in each fragment IP packet in a given flow is the same, and is either the original IP address of the source device, or the IP address of exactly one of the network interfaces, 31 or 32. As a result of this bifurcation mechanism, the fragments comprising a given IP packet that arrived on the local port 11 can be correctly reassembled at the ultimate destination device 201. This can be accomplished, as previously described, with effectively no changes to the destination device 201.

Figure 4:
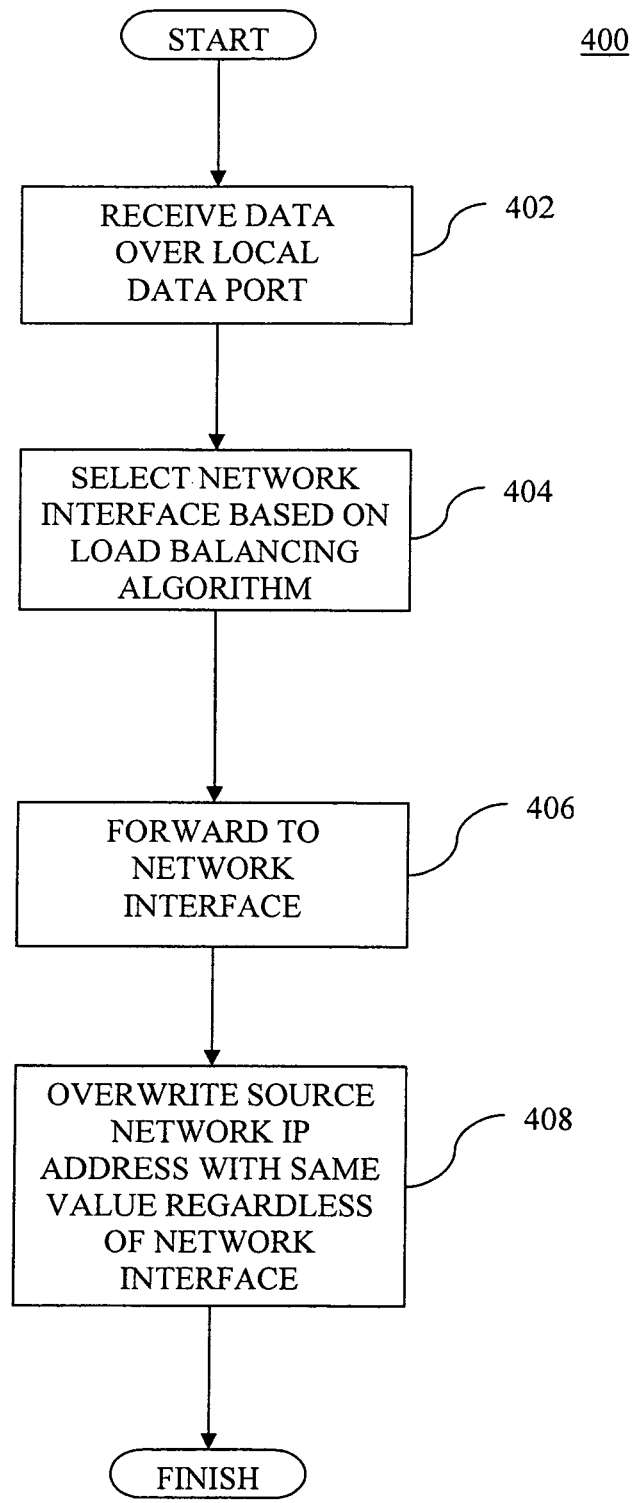
FIG. 4 is a logical flow diagram illustrating a first exemplary method of overwriting a source network IP address field with the same value regardless of the network interface utilized in accordance with the principles of the present invention.

FIG. 4 illustrates an exemplary method 400 for implementing such a process flow. At step 402 data for transfer in the upstream direction is received by the aggregation device 101 over the local data port 11. The device 101 selects a network interface based on any number of considerations including a load balancing algorithm at step 404. The data is then forwarded to a respective network interface at step 406 and the value of the source network IP address is written with either the IP address of the originating device or the IP address associated with exactly one of the plurality of network interfaces so that the data received at the destination device looks the same regardless of the network interface which actually sent the data at step 408.

In practice, fragments may only rarely arrive out of order, and destination devices may be optimized (e.g., buffer allocations made, etc.) on the basis of this assumption. Therefore, it may be desirable that the timing of outgoing fragments from the aggregation device 101 be arranged such that with high probability, the fragments arrive at the ultimate destination 201 in the same order as they would have been with the ordinary fragmentation mechanism within the packet switched network 1000. However, this is by no means a requirement for practicing the invention, especially in more "lossy" applications where a comparatively small number of out-of-order packets will not affect the overall communication quality or effectiveness significantly. Moreover, in another variant of the invention, the optimizations made in the destination device may be used in a dynamic fashion; e.g., where the source device communicates to the destination device that it is using aggregation (such as via a packet, signal, flag bit in a protocol field, etc.), and the destination device accordingly relaxing its optimization so as to provide a more robust and tolerant link.

In the ISP application, the packet switched network 1000 represents the Internet, and the endpoints of the communication links 41, 42 terminate within a point of presence operated by an Internet Service Provider (ISP). In this case, it may be important that the ISP does not "filter" (i.e. selectively discard) IP packets on the basis of the value of the source IP address field in an IP packet. This is because the value of the source IP address field in packets that are injected into the packet switched network 1000 by a network interface 31 may be different than the network (e.g. IP) address of the network interface 31. The practice of such "source address filtering" is not uncommon and is motivated by security concerns associated with source address spoofing. However, an ISP may be motivated to selectively turn off source address filtering in order to support the mechanism disclosed in this invention. Alternatively, signaling or messaging can be employed to cause the ISP to selectively or automatically turn this feature off when aggregation is in use.

A salient feature of performing re-assembly at the network layer is that the mechanism is independent of the transport layer protocol used, for example whether it comprises a TCP, UDP or other such protocol. However, some network operators do not support transit service for IP fragments, and will simply discard IP fragments that are received. Thus it is desirable to have another mechanism to achieve reassembly at the destination device.

Upstream Data Transfers with Transport Layer Re-Assembly

If an upstream data transfer request is made over a reliable transport protocol that supports out-of-order delivery of packets at the network layer, the reliable transport protocol itself can be used to re-assemble traffic at the ultimate destination device 201. One such reliable transport protocol is TCP.

With transport layer re-assembly, the aggregation device 201 simply forwards arriving packets belonging to the same flow for an upstream data transfer to either one of the network interfaces 31 or 32, according to any number of load balancing algorithms. The value of the source network (IP) address field for all such packets, regardless of which network interface is used to carry the packet, is in the illustrated embodiment over-written with the same network (IP) address, which coincides with the network address of one of the network interfaces. Thus, it appears to the remote destination device 201 that the source of the upstream data transfer is one of the network interfaces, either 31 or 32. Due to the different communication links 41, 42 that are used to support the upstream data transfers, the packets originally presented at the local port 11 may arrive out of order at the remote destination device 201. However, the transport protocol (e.g. TCP) implemented at the remote destination device will buffer packets that arrive out of order, so that data can be presented in the correct order to the destination application within the remote destination device 201.

Although the TCP protocol is capable of handling packets that arrive out of order, most implementations are optimized for the case where packets arrive in order with high probability. If packets do arrive at the destination out of order, this will often cause several acknowledgements (ACKs) being sent back to the source with the same sequence number value. Most implementations of TCP are such that three consecutive ACKs with the same sequence number will enable a "congestion avoidance" mode, whereby the sender will decrease the rate of transmissions. This is because in common scenarios of network operation, three consecutive ACKs are an indication of packet loss caused by congestion. With the method disclosed herein, however, packets may more commonly arrive at the destination out of order. This will cause three or more consecutive ACKs to be sent back to the sender even when there is no packet loss within the network, and may cause performance degradation if preventative measures are not taken.

To remedy this situation, the exemplary aggregation device 101 acts as follows. Since the same network address, i.e. that of one of the network interfaces 31 or 32, is over-written into the source network address of every packet in an upstream flow the ACKs will be returned through the network interface whose network address is used as the source network address for all upstream packets in the flow. The aggregation device 101 examines the ACKs that are received from the destination device 201 through the corresponding network interface. If three or more ACKs arrive from the remote destination device 201 with the same sequence number, the third and subsequent ACKs may be discarded by the aggregation device, in an attempt to prevent the source of the data transfer from receiving three or more ACKs with the same sequence number and entering a congestion avoidance mode. A timer mechanism may be used to selectively pass through ACKs with the same sequence number, so that when packet losses and congestion do in fact occur, the upstream data transfer can proceed in the appropriate way. Other such "filtration" or control mechanisms may be used as well. For example, in another variant, the timing of the receipt of the individual ACKs relative to one another can be analyzed to determine if they in fact are related, or constitute a congestion or packet loss condition. This can also be coupled to one or more parameters associated with the transmission side; i.e., three ACKs would occur when packets arrive substantially out of order, and hence the transmission channel(s) may be the root cause of the out-of-order receipt at the destination. Hence, by monitoring in effect "what goes out when", the aggregator 101 can in essence have foreknowledge of or expect the three ACKs when the transmission is highly asynchronous. It can then selectively desensitize itself (e.g., filter one or more of the ACKs, set the threshold to more than three ACKs, etc.). Similarly, as previously described, the destination can also operate dynamically so as to relax its out-of-order processing (including sending multiple ACKs for the same sequence number), relax its out-of-order standards (e.g., increase jitter buffer size so as to allow greater temporal misalignment), and so forth.

Mobile Devices

The algorithms described herein for control of the aggregation device 101 may also be optimized for mobile applications, e.g., so as to consider particular attributes of the mobile communication links (e.g., WiFi, cellular, WiMAX, PAN, etc.) over which the data is flowing, as well as the attributes of the mobile device itself. For example, in one variant, two different wireless (e.g., WiFi and cellular, two WiFi, etc.) links may asymmetric in their capabilities, security (e.g., aforementioned 802.1x/RADIUS capability), etc., and hence may be "intelligently" selected for certain types of traffic or times of use. Moreover, since battery conservation on a mobile device is of paramount importance, the algorithms of the invention may be adapted to optimize power consumption. For example, in one variant, this optimization comprises preferentially using links for the aggregation process that are more power efficient. Wait or sleep states can also be utilized within the device (and the aggregation algorithm), as can opportunistic or non-real time delivery (e.g., waiting to transmit non-time critical data over links when the most power efficient bandwidth becomes available).

It is also noted that while described in terms of packet-switched network embodiments, the present invention can also be applied to other delivery paradigms, such as e.g., packet-over-circuit (e.g., packet over a PSTN), hybrid networks (such as those employing a gateway between a packet-switched and circuit switched network, such as in exemplary H.323, H.248 or similar teleconferencing applications, and so forth.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

It will also be appreciated that while described generally in the context of business/enterprise or consumer (e.g., residence) applications, the present invention may be readily adapted to other types of environments (e.g., government, military, etc.) as well. Myriad other applications are possible.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a communication network, a method of aggregating a plurality of communication channels, the method comprising:
    classifying a plurality of packets that arrive on a first communication interface as belonging to a single communication session;
    selecting one of a plurality of network interfaces that will be associated with said single communication session;
    forwarding a first packet received on said first communication interface to said selected network interface associated with the single communication session that said first packet belongs to;
    updating a source network address of said first packet with the network address associated with said selected network interface; and
    forwarding a second packet received on said selected network interface for transmission onto said first communication interface, wherein the destination network address of said second packet is replaced by the source network address associated with the single communication session that said second packet belongs to.

2. The method of claim 1, wherein said act of selecting is based at least in part on a load balancing algorithm.

3. The method of claim 2, wherein said load balancing algorithm comprises a round robin load balancing algorithm.

4. The method of claim 2, wherein said load balancing algorithm comprises an optimization algorithm adapted to optimize for higher bandwidth channels.

5. The method of claim 1, wherein said act of selecting is based on varying levels of a packet security parameter.

6. The method of claim 2, wherein said load balancing algorithm accounts for a quality of service (QoS) parameter.

7. The method of claim 1, wherein said act of selecting is based on a power consumption parameter.

8. In a communication network, a method of aggregating a plurality of communication channels, the method comprising:
   requesting a plurality of data from a network entity via a first communication interface, said first communication interface in communication with a first and a second network interface;
   wherein said plurality of data comprises a first data object and a second data object;
   receiving said first data object at said first network interface from said network entity;
   receiving said second data object at said second network interface;
   receiving a third data object at said second network interface; and
   forwarding only said first and second data objects to said first communication interface;
   wherein said first and third data objects comprise a pair of redundant data objects;
   wherein said first and third data objects correspond to a first and a second acknowledgement message, respectively; and
   wherein said first and second acknowledgement messages are identical.

9. The method of claim 8, wherein said acts of receiving is based at least in part on a load balancing algorithm.

10. The method of claim 9, wherein said load balancing algorithm comprises a round robin load balancing algorithm.

11. The method of claim 9, wherein said load balancing algorithm comprises an optimization algorithm adapted to optimize for higher bandwidth channels.

12. The method of claim 8, wherein said acts of receiving is based on varying levels of a packet security parameter.

13. In a packet based communication network, a method of aggregating communication channels, the method comprising:
   classifying a first plurality of packets that arrive on a first communication interface as belonging to a single communication session, said single communication session representing a data transfer in the upstream direction;
   dividing a first packet received on said first communication interface belonging to said single communication session into a plurality of fragments; and
   forwarding a first fragment of said plurality of fragments over a first network interface and forwarding a second fragment of said plurality of fragments over a second network interface;
   wherein said first fragment and said second fragment comprises at least one identifier indicating to an entity performing network source address filtering on said plurality of fragments that said first fragment and said second fragment are of a same origin, identification of said identifier by said entity causing said entity to cease said network source address filtering of said fragments.

14. The method of claim 13, wherein said acts of forwarding is based at least in part on a load balancing algorithm.

15. The method of claim 14, wherein said load balancing algorithm comprises a round robin load balancing algorithm.

16. The method of claim 14, wherein said load balancing algorithm comprises an optimization algorithm adapted to optimize for higher bandwidth channels.

17. In a packet based communication network, a method of avoiding the enactment of a false congestion avoidance mode of a transmitting source device, the method comprising:
   forwarding a plurality of data packets from a local port over a plurality of network interface ports, said forwarding comprising redundantly sending the same ones of said plurality of data packets over different ones of said plurality of network interface ports;
   receiving an acknowledgment message comprising a sequence number at one of said plurality of network interface ports;
   determining whether said sequence number is identical to a previously received acknowledgment message;
   selectively discarding redundant ones of said plurality of data packets corresponding to said acknowledgement message which is identical to said previously received message; and
   selectively discarding said acknowledgement message so as to avoid said transmitting source device from unnecessarily entering a congestion avoidance mode.

18. The method of claim 17, wherein said act of selectively discarding said acknowledgment message is performed utilizing a timer mechanism.

19. The method of claim 17, wherein said act of forwarding, comprises:
   (a) classifying said plurality of data packets that arrive on said local port as belonging to a single communication session;
   (b) selecting one of said plurality of network interface ports that will be associated with said single communication session;
   (c) forwarding a first packet associated with the single communication session to a first of said plurality of network interface ports;
   (d) updating a source network address of said first packet with the network address associated with said first network interface port; and
   (e) forwarding a second packet associated with said single communication session to a second of said plurality of network interface ports, wherein the source network address of said second packet is replaced by the source network address associated with the first network interface port.

20. The method of claim 19, wherein said act of selecting is based at least in part on a load balancing algorithm.

21. The method of claim 20, wherein said load balancing algorithm comprises a round robin load balancing algorithm.

22. The method of claim 20, wherein said load balancing algorithm comprises an optimization algorithm adapted to optimize for higher bandwidth channels.

23. The method of claim 17, further comprising analyzing the timing of the receipt of said acknowledgement message and said previously received acknowledgement message so as to determine whether: (1) said acknowledgment messages are related; or (2) said acknowledgment messages indicate a congestion condition.

24. An apparatus for increasing the speed of network communications, said apparatus comprising:
- a processor;
- a storage device in communication with said processor; and
- at least one computer program stored on said storage device that when executed:
  - receives a request for a plurality of data via a first communication interface from a computing device, said plurality of data comprising a first data object and a second data object and belonging to a single communication session; and
  - determines whether said requested plurality of data exceeds a predetermined size threshold;
- wherein if it is determined that said requested plurality of data exceeds said predetermined size threshold, said computer program further:
  - forwards said first data object request to a first network interface;
  - forwards said second data object request to a second network interface;
  - receives said first data object at said first network interface;
  - receives said second data object at said second network interface; and
  - forwards said first and second data objects to said first communication interface.

25. The apparatus of claim 24, wherein said acts of receiving are based at least in part on a load balancing algorithm.

26. The apparatus of claim 25, wherein said load balancing algorithm comprises a round robin load balancing algorithm.

27. The apparatus of claim 25, wherein said load balancing algorithm comprises an optimization algorithm adapted to optimize for higher bandwidth channels.

28. The apparatus of claim 25, wherein said first and second network interfaces are connected with first and second communication links, respectively.

29. The apparatus of claim 28, wherein said computing device is unaware of said acts of receiving said first and second data objects at said first and second network interfaces, respectively.

30. The apparatus of claim 29, wherein said computing device is unaware of said acts of forwarding said first and second data object requests to said first and second network interfaces, respectively.

31. In a communication network, a method of aggregating a plurality of communication channels, the method comprising:
- classifying a plurality of packets that arrive on a first communication interface as belonging to a single communication session;
- selecting a plurality of network interfaces that will be associated with said single communication session;
- receiving a first packet on said first communication interface;
- updating a source network address of said first packet with the network address associated with one of said selected network interfaces;
- transmitting said first packet upstream to said network via said one of said selected network interfaces associated with said single communication session;
- receiving a plurality of second packets on said plurality of selected network interfaces, said plurality of second packets comprising fragments of a single requested data stream;
- assembling said plurality of second packets into said single requested data stream; and
- forwarding said single requested data stream via said first communication interface, wherein a destination network address of said plurality of second packets comprising said single requested data stream is replaced by the source network address associated with the single communication session to which said second packets belong.

32. In a communication network, a method of aggregating a plurality of communication channels, the method comprising:
- classifying a plurality of packets that arrive on a first communication interface as belonging to a single communication session;
- selecting a plurality of network interfaces that will be associated with said single communication session;
- receiving said plurality of packets on said first communication interface, said plurality of packets comprising fragments associated with said single communication session;
- updating source network addresses of said plurality of packets with a network address associated with only one of said selected plurality of network interfaces; and
- transmitting said packets upstream to said network via any of said selected network interfaces associated with said single communication session;
- wherein said transmission of said plurality of packets via any of said selected network interfaces occurs regardless of the value of said updated source network addresses.

* * * * *